United States Patent [19]

Hyggen

[11] Patent Number: 4,549,591
[45] Date of Patent: Oct. 29, 1985

[54] DEVICE FOR FITTING AND FIXING GRIPPING SHOES ON VEHICLE WHEELS

[75] Inventor: Egil E. Hyggen, Oslo, Norway

[73] Assignee: Elkem a/s, Norway

[21] Appl. No.: 626,282

[22] Filed: Jun. 29, 1984

[30] Foreign Application Priority Data

Jul. 5, 1983 [NO] Norway ............................... 832451

[51] Int. Cl.[4] ...................... B60C 27/20; B60C 27/12
[52] U.S. Cl. .................................. 152/218; 74/89.17;
74/422; 152/216; 152/225 C
[58] Field of Search .................... 152/218, 216, 225 R,
152/225 C, 226–230, 213 R, 217, 220; 24/20
TT, 241 SL; 157/16, 21; 301/40 R, 41 R, 44 R,
44 T; 74/422, 89.17

[56] References Cited

U.S. PATENT DOCUMENTS 3,547,176 12/1970 Hyggen ............................... 152/218
4,122,880 10/1978 Hyggen ........................... 152/218 X
4,209,049 6/1980 Regensburger ................. 152/218 X Primary Examiner—Edward Kimlin
Assistant Examiner—Thomas Bokan
Attorney, Agent, or Firm—Lucas & Just

[57] ABSTRACT

The invention relates to a device for fitting and fixing gripping shoes on vehicle wheels. Four gripping shoes are fitted at the one end of respective arms which, after being fitted on the wheel, form a cross. The other ends of the arms of the gripping shoes are toothed and the arms are slidingly suspended in their longitudinal directions relative to a housing centrally situated with respect to the wheel and are movable by means of a gear wheel, rotatably mounted in the housing. The gear wheel engages with the teeth on the arms and is rotatable by means of an operating mechanism. The centrally situated housing is shaped from one piece in which there are arranged four channels for slidingly suspending and guiding the arms of the gripping shoes. The channels are running from the lower part and in the same plane on each of the short sides of the centrally situated housing and are running out at the upper part and in the same plane on opposite short sides of the centrally situated housing. The channels are running at an angle between 7° and 15° with respect to the horizontal plane of the centrally situated housing.

12 Claims, 7 Drawing Figures

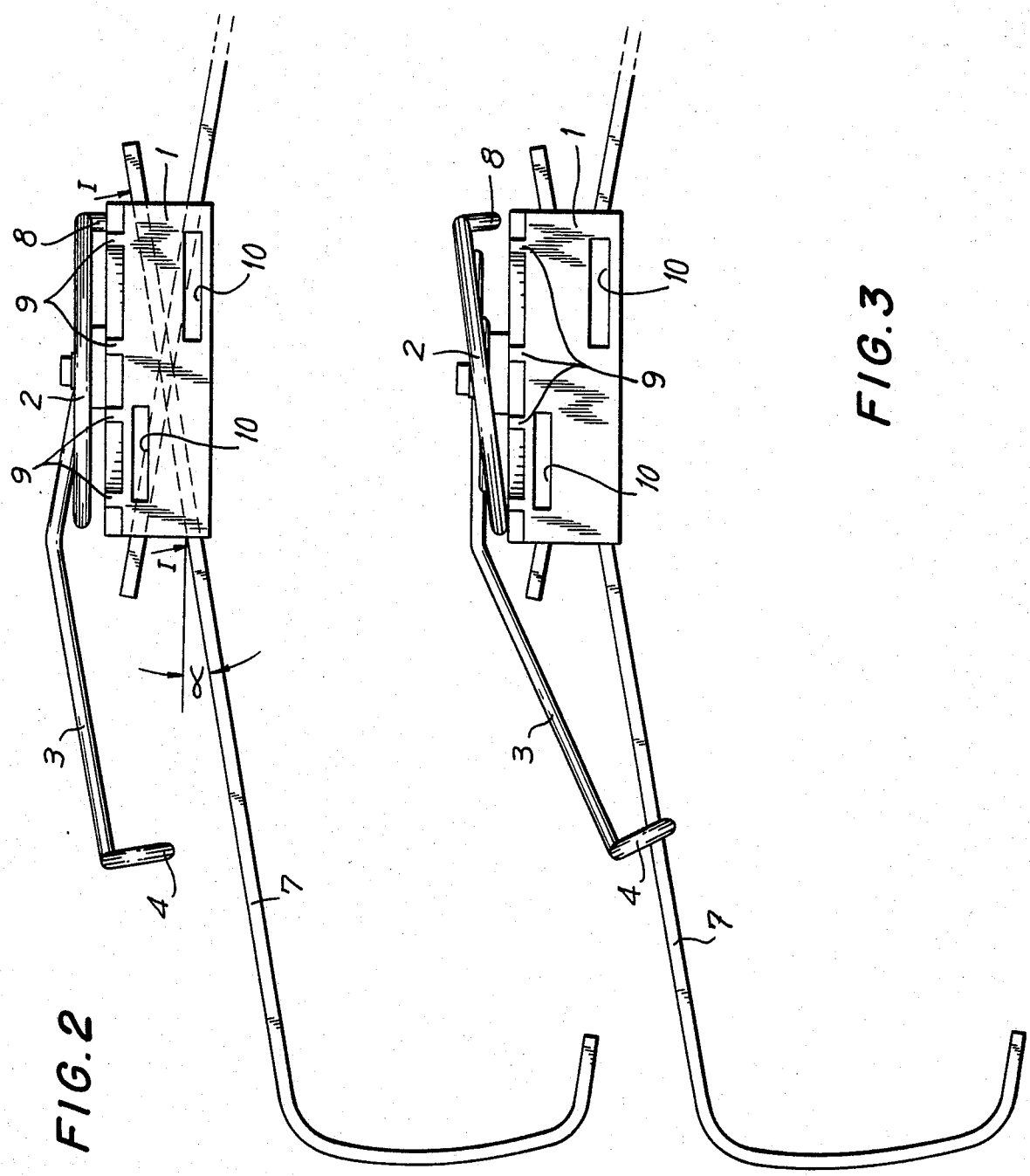

DEVICE FOR FITTING AND FIXING GRIPPING SHOES ON VEHICLE WHEELS

The present invention relates to a device for fitting and fixing gripping shoes on vehicle wheels, in which four gripping shoes are fitted at the one end of their respective arms, which arms after being fitted onto the wheel form a cross, the other ends of which are toothed and are slidably suspended in their longitudinal directions relative to a housing centrally situated with respect to the wheel and movable with the help of a gear wheel, rotatable arranged in the housing, which engages with the teeth on the arms and which is rotatable by means of an operating mechanism.

From U.S. Pat. No. 3,547,176 there is known such a device for fitting and fixing gripping shoes on vehicle wheels. Unfortunately this known device suffers from a number of drawbacks and disadvantages. Firstly, the centrally situated housing for suspending the arms is, according to the known device, divided into two halves which may be rotated about the axis of the gear wheel, each containing guides for two of the arms. Because the housing is divided into two halves it is mechanically weak and this may lead to breakage of the housing during use.

Because the two halves of the centrally situated housing have to be rotated relative to one another when fitting the device onto a wheel, the angle between the arms and the dividing plane of the housing should not exceed 3°. For greater angles the thickness or height of the housing will become unexceptable. This low angle will give poor springing in axial direction when the device is in use. The variable force from the gripping shoes when striking against the ground, therefore imposes strong vibrations to the vehicle during driving. The poor springing in axial direction further exposes the gear wheel to a strong variable force which in turn can cause breakage of the gear wheel.

Further, as the angle between the dividing plane of the centrally situated housing and the arms is very small there is a risk that with too strong tightening of the shoes to the wheel, the centrally housing will come nearer to the center of the wheel than the gripping arms, that is, the angle between the arms and the diving plane of the centrally situated housing will be negative. In this case the centrally situated housing will have an axial springing in direction towards the center of the wheel. This is detrimental both to the gripping device and to the wheel cap.

The device according to U.S. Pat. No. 3,547,176 further has the disadvantage that the toothing on the arms when the device is fitted on a wheel, protrudes through the centrally housing. The part of the toothing protruding through the centrally situated housing represents a weakening of the mechanical strenth of the arms as the toothing will act as a startpoint for breakages of the arms.

In the known device, the four arms are suspended in the centrally housing also when the device is not in use. Even if the device can be folded together by rotating the two halves of the centrally situated housing when not in use, the device occupies comparatively much storage space. Finally the known device is difficult to use on particular vehicles, where the distance between the wheel and the body of the vehicle is short.

An object of the present invention is to overcome these drawbacks and disadvantages of the known device and this is achieved according to the present invention by a new shape of the centrally situated housing. In accordance with an embodiment of the present invention the centrally situated housing is made in one piece. This gives a substantially higher mechanical strength compared to the centrally situated housing consisting of two halves which is used in the known devices. In the centrally situated housing there are arranged four channels which are intended to suspend and guide the arms of the four gripping shoes. The channels are crossing each other both in the horizontal plane and the vertical plane of the centrally situated housing. In this way a greater angle is achieved between the horizontal plane of the centrally situated housing and the arms of the gripping shoes without increasing the height of the centrally situated housing. The said greater angle assures a good axial springing in outwards direction from the vehicle wheel when the device is in use.

In accordance with another embodiment of the present invention the arms of the gripping shoes can be totally released from the centrally situated housing when not in use. This gives the advantage that the device according to the present invention occupies considerably less storage space than the hietherto known devices. Finally the device according to the present invention is very simple to mount and demount on a wheel.

The present invention therefore relates to a device for fitting and fixing gripping shoes on vehicle wheels, in which four gripping shoes are fitted at the one end of respective arms which arms after being fitted onto the wheel from a cross, the other ends of which are toothed and are slidably suspended in their longitudinal directions relative to a housing centrally situated with respect to the wheel and movable with the help of a gear wheel, rotatably mounted in the housing, which engages with the teeth on the arms and which is rotatable by means of an operating mechanism, the new and inventive steps of the present invention consisting in that the centrally situated housing is made in one piece in which centrally situated housing there are arranged four channels for suspending and guiding the arms of the gripping shoes, the channels running from the lower part and in the same plane on each of the short sides of the centrally situated housing and running out at the upper part and in the same plane on opposite short sides of the centrally situated housing, the channels running at an angle betweeen 7° and 15° with respect to the horizontal plane of the centrally situated housing.

Further embodiments of the present invention will be evident from the following description and the claims.

One preferred embodiment of the present invention will now be explained in further detail with reference to the drawings.

FIG. 2 shows a side view of the centrally situated housing with two of the gripping arms mounted in the centrally situated housing.

FIG. 3 shows a side view of the centrally situated housing with two of the gripping arms mounted in the centrally situated housing and with the operating mechanism fixed to one of the arms.

Figure 1:
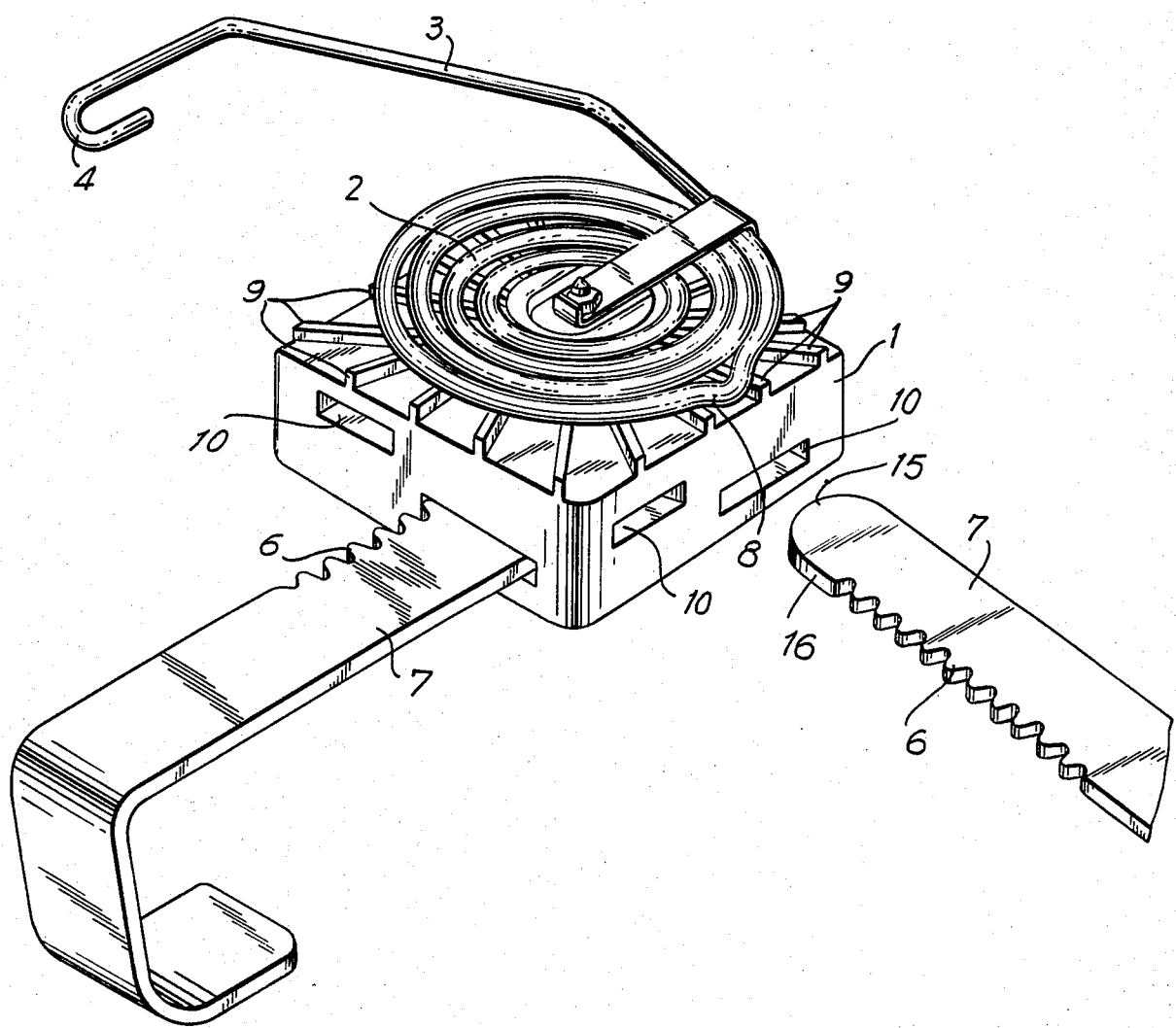
FIG. 1 shows a general view of the device according to the present invention with one of the arms of the gripping shoes mounted in the centrally situated housing and one of the arms ready for mounting.

In FIG. 1 the centrally situated housing is shown by numeral 1. The centrally situated housing 1 is made in one piece. In the centrally situated housing 1 there is four channels 10 running all through the housing 1. Each channel 10 runs from the lower part of one of the short sides of the centrally situated housing 1 through the body of the housing 1 and runs out in the upper part of the opposite short side of the housing 1. Thus the channels 10 are crossing each other both in the horizontal plane and vertical plane of the centrally situated housing 1. As shown in FIG. 2 the channels 10 are running at an angle to the horizontal plane of the centrally situated housing 1. This angle is between 7° and 15° and preferably 10°.

Each of the channels 10 is intended to suspend and to guide one of the arms 7 of the gripping shoes.

An operating mechanism 2 having an operating handle 3 and a fixing hook 4 is fastened to a gear wheel 5 (see FIG. 4) the gear wheel 5 being situated centrally in the housing 1. The operating mechanism 2 is used to rotate the gear wheel 5. The toothing 11 of the gear wheel 5 protrudes into the channels 10 in the centrally situated housing 1 and is intended to cooperate with a toothing 6 on the arms 7 of the gripping shoes when the arms 7 are mounted in the channels 10. The first tooth of the toothing 6 on the arms 7 is preferably lower than the rest of the teeth.

The operating mechanism 2 is made and mounted in such a way that when not being operated, it will have a force momentum which is pressing a member 8 on the operating mechanism 2 towards the centrally situated housing 1. On the side of the centrally situated housing 1 where the operating component 2 is situated, there are a plurality of ribs or the like 9. When the operating mechanism 2 is not being operated, the member 8 will be automatically pressed down between two of the ribs 9 and hence the operating mechanism 2 and thereby the gear wheel 5 will be in locked position. The operating mechanism 2 and the gear wheel 5 will be in locked position except when the operating component is being operated or the device is fixed on a vehicle wheel.

The side of the centrally housing 1 on which the operating mechanism 2 is arranged will, when the device is fitted on a tire, turn away from the wheel center.

On the sides of the channels 10 which are at the longest distance from the center of the housing 1, there are broadenings 12 in which there are mounted springs 13. The broadenings 12 of the channels 10 are made in such a way that the channels 10 after the springs 13, seen in the mounting direction of the arms 7 of the gripping shoes, have inclined surfaces 14.

The significance of the springs 13 and the inclined surfaces 14 will be evident from the following description of how the arms 7 of the gripping shoes are mounted and demounted in the centrally situated housing 1.

Figure 5:
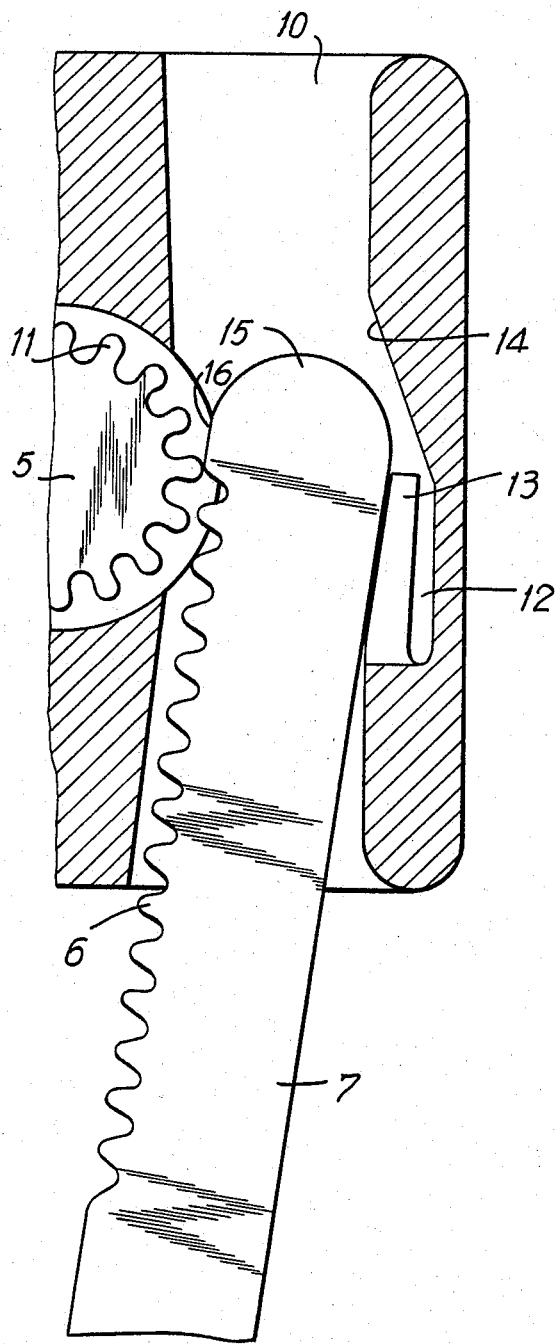
FIG. 4–7 are sections seen along line I—I in FIG. 2 showing different positions when mounting one of the arms of the gripping shoes in the centrally situated housing.
Figure 4:
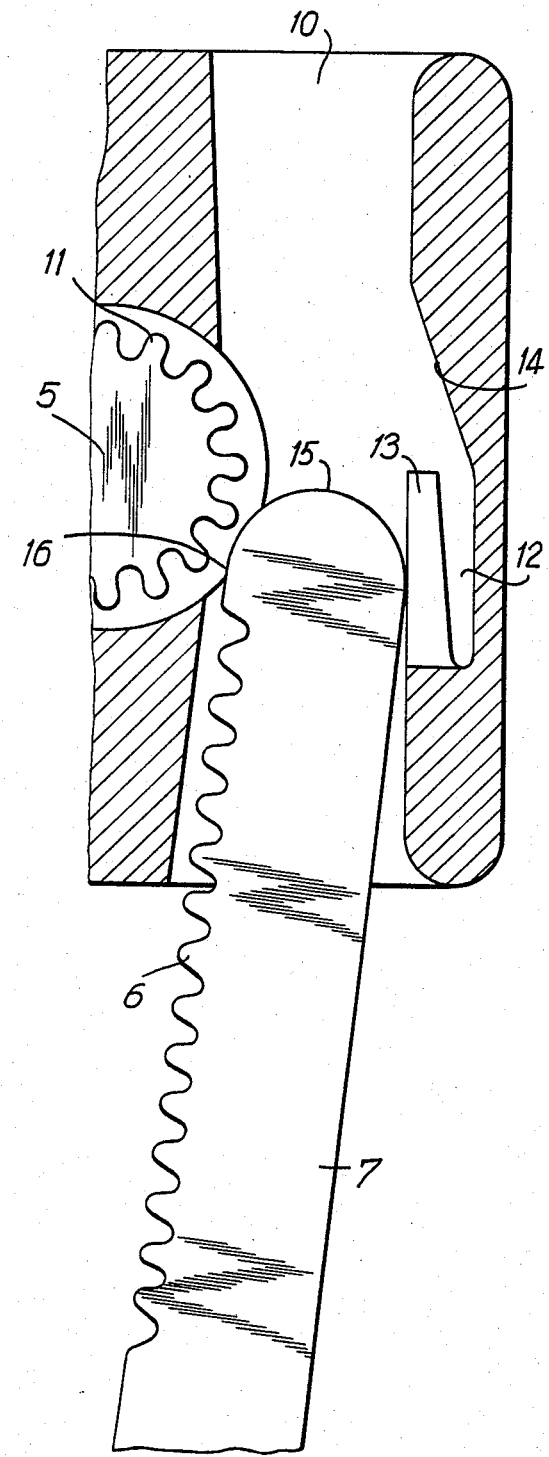
Figure 7:
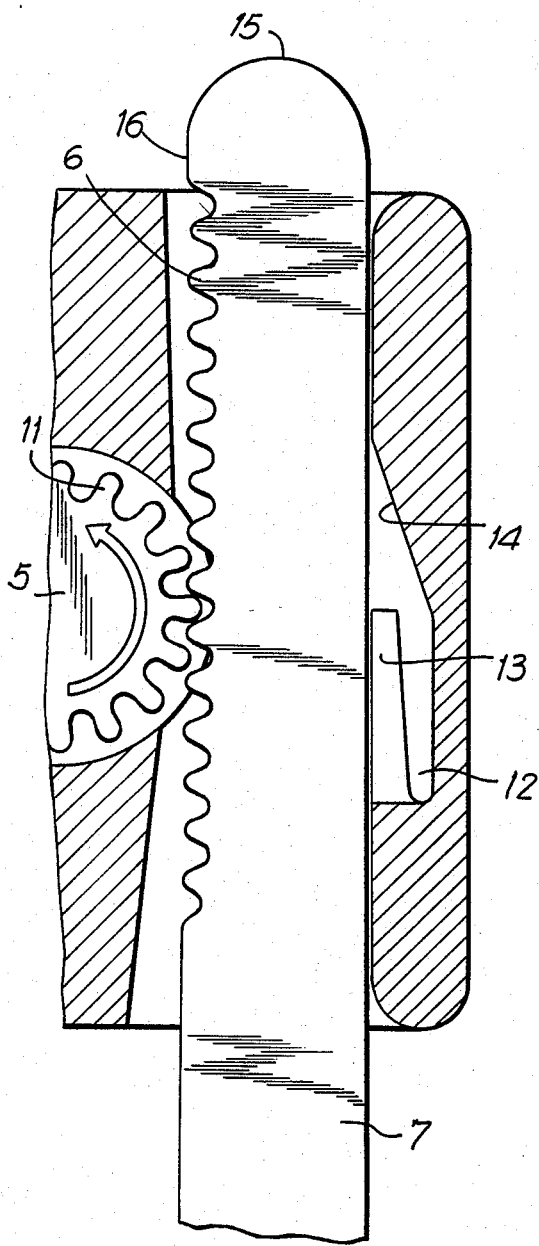
Figure 6:
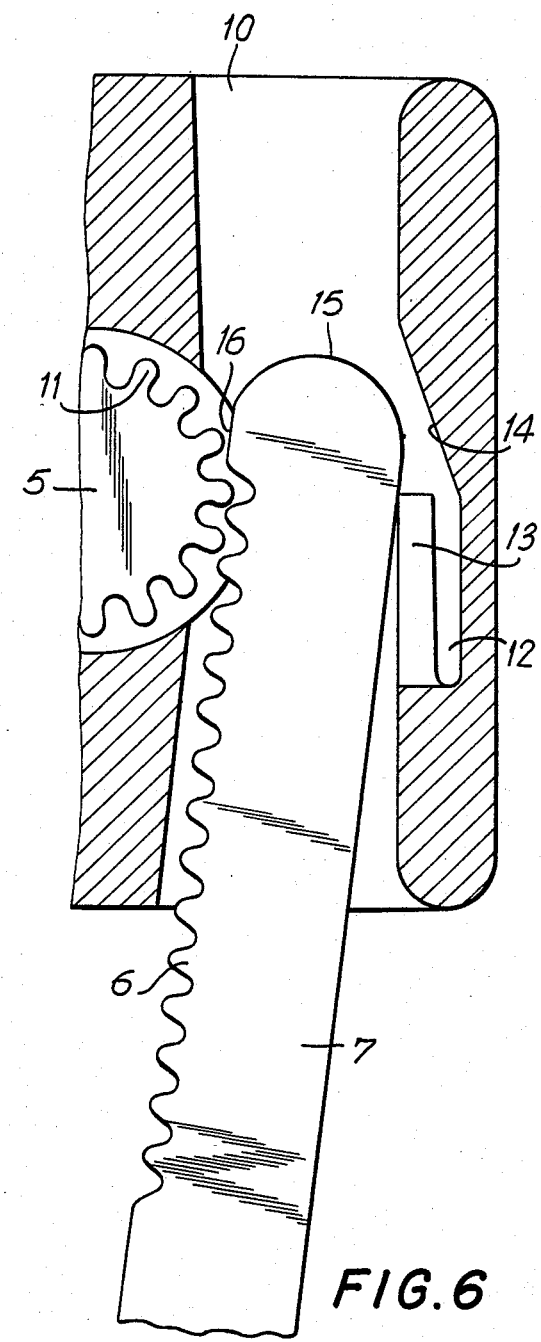

The mounting and demounting of the arms 7 in the centrally situated housing 1 will now be explained with reference to FIGS. 4 to 7:

The operating mechanism 2 and thereby the gear wheel 5 are in locked position by the member 8 being pressed between two of the ribs 9 on the centrally situated housing. The mounting starts by manually moving one of the arms 7 of the gripping shoes inwardly through one of the four channels 10. The arm 7 will then come into contact with the toothing 11 of the gear wheel 5 and the spring 13. This position is shown in FIG. 4. By further inwardly movement of the arm 7 through the channel 10, the spring 13 will swing backwards as the section 16 of the arm 7 slides upon the toothing 11 of the gear wheel 5. This position is shown in FIG. 5. By further inwardly movement of the arm 7 the spring 13 will press the toothing 6 of the arm 7 into engagement with the toothing 11 of the gear wheel 5. Thus the arm 7 is locked. This position is shown in FIG. 6. To make sure that the toothing 6 of the arms 7 will be pressed into engagement with the toothing 11 of the gear wheel 5, the first tooth on the toothing 6 has a lower height than the rest of the teeth. As the gear wheel 5 is locked, the arm 7 now cannot be moved any further into the channel 10 and on the other side, the arm 7 cannot be retracted (see FIG. 6).

The other three arms 7 of the gripping shoes are now fitted into the channels 10 one at a time following the same sequence as described above. Because the gear wheel 5 is locked in exactly the same position while the four arms 7 are mounted in the channels 10, it is assured that the four arms 7 will come into engagement with the gear wheel 5 in exactly the same position.

When the four arms have been moved into engagement with the toothing 11 of the gear wheel 5 to the position shown in FIG. 6, the operating handle 3 of the operating mechanism 2 is pressed down. By this downward movement of the operating handle 3, the member 8 on the operating mechanism 2 will move out of the engagement between two of the ribs 9, and the locking of the gear wheel 5 is thus released. The further inwardly movement of the arms 7 into the channels 10 is now done by rotating the gear wheel 5 by means of the operating mechanism 2. This is shown in FIG. 6. The rounded edges 15 on the ends of the arms 7 will then touch against the inclined surfaces 14 of the channels 10 and hence the arms 7 are guided further into the channels 10. When the inwardly movement of the arms into the channels 10 is finished, that is, when the gripping shoes are tightened against the vehicle wheel, the hook 4 on the operating handle 3 of the operating mechanism is hooked on one of the arms 7 of the gripping shoes (see FIG. 3). The device according to the present invention is now fitted on the vehicle wheel and ready for use. As the hook 4 is hooked on one of the arms 7, the member 8 will be out of engagement with the ribs 9 and will be in this position as long as the device is fixed on the tire.

For demounting the device according to the present invention, the gear wheel 5 is rotated in opposite direction by means of the operating handle 3 of the operating mechanism 2. When the arms 7 have been moved outwards to the position shown in FIG. 6, the toothing 11 of the gear wheel 5 will climb out of engagement with the toothing 6 of the arms 7 and thereby press the arms 7 against the springs 13. By continued rotation of the gear wheel 5 the four arms 7 are pushed outwardly from the channels 10 until they finally will fall out of the centrally situated housing 1. The demounting of the device is then finished.

To assure that all four arms 7 will come exactly equally far into the channels 10 while the gear wheel is in locked position, it is important that the gear wheel has a number of teeth that is a multiple of four, as this will assure that the teeth on the gear wheel will be in exactly the same position in all four channels. It is preferred to use a gear wheel with sixteen teeth, but it is within the scope of the present invention to use a gear wheel with for example twelve or twenty teeth.

The toothing on the arms of the gripping shoes preferably have such longitudinal extension that the whole toothing is inside the centrally housing when the device according to the present invention is fitted on a tire.

Of the same reason as the number of teeth on the gear wheel are a multiple of four, the number of ribs on the centrally situated housing also must be a multiple of four. It is preferred that the number of ribs on the centrally situated housing are equal to the number of teeth on the gear wheel. It is thereby assured that the toothing of the gear wheel will be in exactly the same position in all four channels in the centrally housing without regard to which two ribs the member on the operating mechanism is engaged between.

It is further preferred that the ribs on the centrally housing are positioned in such a way that when the gear wheel is locked by the member on the operating mechanism being in engagement between two of the ribs, the top of the teeth on the gear wheel which protrude into each of the channels, are perpendicular to the length axis of each of the four channels, and thereby also perpendicular to the arms of the gripping shoes when they are moved into the channels in the centrally situated housing.

I claim:

1. A device for fitting and fixing gripping shoes on vehicle wheels, in which four gripping shoes are fitted at the one end of respective arms (7) which arms (7), after being fitted onto the wheel, form a cross, and the other ends of which arms (7) are toothed (6) and are slidably suspended in their longitudinal direction relative to a housing (1) centrally situated with respect to the wheel, and movable with the help of a gear wheel (5), rotatably arranged in the housing (1), which engages with the teeth (6) on the arms (7) and which is rotated by means of an operating mechanism (2), characterized in that the centrally situated housing (1) is made in one piece, in which said centrally situated housing (1) there are arranged four channels (10) for suspending and guiding the arms (7) of the gripping shoes, said channels (10) running from the lower part and in the same plane on each of the short sides of the central situated housing (1) and running out at the upper part and in the same plane on the opposite short sides of the centrally situated housing (1), the channels (10) running at an angle between 7° and 15° with respect to the horizontal plane of the centrally situated housing (1).

2. A device according to claim 1, characterized in that the channels (10) run at an angle of 10° with respect to the horizontal plane of the centrally situated housing (1).

3. A device according to claim 1, characterized in that in each of the channels (10) there is situated a spring (13) which by mounting and demounting of the arms (7) in the channels (10), biases the arms (7) against the gear wheel (5).

4. A device according to claim 3, characterized in that the springs (13) consist of lips which are integral parts of the centrally situated housing (1).

5. A device according to claim 4, characterized in that the lips are formed by stamping of parts of the centrally situated housing (1).

6. A device according to claim 1, characterized in that a plurality of ribs or the like (9) are arranged on the side of the centrally situated housing (1) where the operating mechanism (2) is situated and that the operating mechanism (2) has a locking member (8) which when the operating mechanism (2) is not operated, is operative to be engaged between two of said ribs (9) whereby the gear wheel (5) is locked.

7. A device according to claim 6, characterized in that the number of ribs (9) is a multiple of the number of channels (10) in the centrally situated housing (1).

8. A device according to claim 6, characterized in that the number of ribs (9) is equal to the number of teeth (11) on the gear wheel (5).

9. A device according to claim 1, characterized in that each channel (10) behind the springs (13) is equipped with an inclined surface (14) which is operative to guide the arms (7) into the channels (10).

10. A device according to claim 3, characterized in that the first tooth on the toothing (6) on the arms (7) is lower than the rest of the teeth.

11. A device according to claim 2, characterized in that each channel (10) behind a spring (13) is equipped with an inclined surface (14) which is operative to guide the arms (7) into the channels (10).

12. A device according to claim 3, characterized in that each channel (10) behind the springs (13) is equipped with an inclined surface (14) which is operative to guide the arms (7) into the channels (10).

* * * * *